(12) United States Patent
Xiao

(10) Patent No.: US 12,109,921 B2
(45) Date of Patent: Oct. 8, 2024

(54) SEAT BELT FIXING DEVICE

(71) Applicant: WONDERLAND SWITZERLAND AG, Steinhausen (CH)

(72) Inventor: Xiaohong Xiao, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/098,123

(22) Filed: Jan. 18, 2023

(65) Prior Publication Data

US 2023/0150402 A1 May 18, 2023

Related U.S. Application Data

(63) Continuation of application No. 17/329,195, filed on May 25, 2021, now Pat. No. 11,584,266.

(30) Foreign Application Priority Data

May 26, 2020 (CN) .......................... 202010459845.2

(51) Int. Cl.
*B60N 2/28* (2006.01)
(52) U.S. Cl.
CPC ......... *B60N 2/2806* (2013.01); *B60N 2/2821* (2013.01); *B60N 2/2842* (2013.01)
(58) Field of Classification Search
CPC .............................. B60N 2/2806; B60N 2/2842
See application file for complete search history.

(56) References Cited

U.S. PATENT DOCUMENTS

| | | | | |
|---|---|---|---|---|
| 8,322,788 B2 * | 12/2012 | Williams | ............. | B60N 2/2821 |
| | | | | 297/256.16 |
| 8,573,695 B2 * | 11/2013 | Van Geer | ............. | B60N 2/2824 |
| | | | | 297/256.16 |
| 8,973,991 B2 * | 3/2015 | Wuerstl | ............... | B60N 2/2821 |
| | | | | 297/253 |
| 9,365,135 B2 * | 6/2016 | Carpenter | ............ | B60N 2/2803 |
| 9,499,074 B2 | 11/2016 | Strong et al. | | |
| 10,035,436 B2 * | 7/2018 | Zhou | .................... | B60N 2/2806 |
| 10,040,377 B2 | 8/2018 | Mason et al. | | |
| 10,189,381 B2 | 1/2019 | Williams et al. | | |
| 10,336,219 B2 * | 7/2019 | Mason | ................. | B60N 2/2821 |
| 10,406,947 B2 | 9/2019 | Anderson et al. | | |

(Continued)

FOREIGN PATENT DOCUMENTS

| | | |
|---|---|---|
| CN | 1976830 A | 6/2007 |
| CN | 202243327 U | 5/2012 |

(Continued)

OTHER PUBLICATIONS

Non Final Office Action issued to US counterpart application (U.S. Appl. No. 17/329,196) on Nov. 4, 2022.

(Continued)

*Primary Examiner* — Philip F Gabler

(57) ABSTRACT

A seat belt fixing device is provided. The seat belt fixing device includes a top rod body and a seat belt clamp. The top rod body is pivotally disposed and selectively locked to a seat. The seat belt clamp is disposed on the seat and includes a first clamping element and a second clamping element. The second clamping element is coupled to the top rod body for being rotated to a locked position to clamp a seat belt in conjunction with the first clamping element.

10 Claims, 10 Drawing Sheets

(56) References Cited

U.S. PATENT DOCUMENTS

| | | | |
|---|---|---|---|
| 10,696,192 B2* | 6/2020 | Harmes, V | B60N 2/2872 |
| 10,737,593 B1* | 8/2020 | Shellenberger | B60N 2/2806 |
| 11,299,074 B2 | 4/2022 | Goare et al. | |
| 2011/0140491 A1* | 6/2011 | Williams | B60N 2/2821 |
| | | | 297/256.16 |
| 2015/0183341 A1* | 7/2015 | Carpenter | B60N 2/2821 |
| | | | 297/256.16 |
| 2016/0046213 A1 | 2/2016 | Kirstein | |
| 2016/0347210 A1 | 12/2016 | Mason et al. | |
| 2018/0345827 A1 | 12/2018 | Anderson et al. | |
| 2021/0370808 A1* | 12/2021 | Xiao | B60N 2/2845 |
| 2021/0370809 A1* | 12/2021 | Xiao | B60N 2/2845 |

FOREIGN PATENT DOCUMENTS

| | | | |
|---|---|---|---|
| CN | 102765337 A | 11/2012 | |
| CN | 204774756 U | 11/2015 | |
| CN | 109747491 A | 5/2019 | |
| EP | 3564067 A1 | 11/2019 | |

OTHER PUBLICATIONS

1st Office Action issued to German counterpart application (application No. 10 2021 006 666.9) on Feb. 22, 2024.
1st Office Action issued to China counterpart application (application No. 202010458700.0) on Mar. 22, 2024.
1st Office Action issued to China counterpart application (application No. 202010459845.2 on Mar. 22, 2024.

* cited by examiner

SEAT BELT FIXING DEVICE

CROSS-REFERENCE TO RELATED APPLICATION

This application is a continuation application of U.S. patent application Ser. No. 17/329,195 filed on May 25, 2021, which is the US national phase of China Patent application No. 202010459845.2 filed on May 26, 2020. The entire contents of these applications are incorporated herein by reference.

BACKGROUND OF THE INVENTION

1. Field of the Invention

The present disclosure relates to vehicular seats, and in particular to a seat belt fixing device.

2. Description of the Related Art

A conventional child seat mounted on a vehicular seat is dedicated to a child passenger and equipped with a binder apparatus for fastening the child passenger to the child seat to ensure the child passenger's safety. The child seat minimizes injuries caused to the child passenger in case of an urgent brake or collision and thus is readily accepted by consumers and popularized worldwide.

The child seat is fixed to the vehicular seat with a special seat connector or seat belt. To this end, the vehicular seat is equipped with a special seat belt fixer for clamping a seat belt. Conventionally, the seat belt fixer is provided in the form of one or more spring clips. Users stretch the spring clips, insert the seat belt, and release the spring clips, allowing the seat belt to be held by the spring clips. However, the spring clips pose a risk to user safety.

A vehicular seat for use by infant comprises a base and a carrycot. The base is directly fixed to the vehicular seat. The carrycot is mounted on the base. However, the carrycot and base are separable, and thus only the bottom surface of the base is in contact with the vehicular seat, thereby resulting in insufficient stability. Prior art discloses lengthening the end portion of the base and providing a support rail (for example, a support leg 11 of CN204398919U and a support back rest of CN305364393S) on the end portion of the base, at the cost of fixing the seat belt in place with a spring clip, thereby rendering the products structurally complicated, bulky, difficult to deliver, and expensive.

Therefore, it is imperative to provide a seat belt fixing device.

BRIEF SUMMARY OF THE INVENTION

An objective of the present disclosure is to provide a seat belt fixing device which are structurally simple, safe, stable, and easy to use.

To achieve at least the above objective, a seat belt fixing device is provided. The seat belt fixing device includes a top rod body and a seat belt clamp. The top rod body is pivotally disposed and selectively locked to a seat. The seat belt clamp is disposed on the seat and includes a first clamping element and a second clamping element. The second clamping element is coupled to the top rod body for being rotated to a locked position to clamp a seat belt in conjunction with the first clamping element.

In some implementations, the seat belt fixing device further includes a locking element and a fixedly engaging element. The locking element is configured to be selectively coupled to the fixedly engaging element to lock the top rod body.

In some implementations, the seat belt fixing device further includes an operating element. The operating element is coupled to the locking element for selectively engaging the locking element to the fixedly engaging element.

In some implementations, the locking element includes a fittingly engaging element and a first resilient element. The fittingly engaging element selectively engages the fixedly engaging element, and the first resilient element abuts against the fittingly engaging element.

In some implementations, a fixedly engaging groove is formed on the fixedly engaging element. The fittingly engaging element is a hook, and the hook is selectively engagingly coupled to the fixedly engaging groove.

In some implementations, the seat belt clamp further includes a second resilient element abutting against the second clamping element.

In some implementations, the top rod body includes a rotating portion, a rotation arm and a blocking transverse arm. The rotating portion is pivotally disposed on the seat. An end of the rotation arm is connected to the rotating portion, and the blocking transverse arm is perpendicularly disposed on another end of the rotation arm.

In some implementations, the top rod body further includes a mounting rod. The mounting rod is connected between the rotating portion and the rotation arm. The seat belt fixing device further includes a locking element, and the locking element is disposed on the mounting rod.

In some implementations, the rotation arm and the blocking transverse arm form a blocking fixing portion, and an acute angle is formed between straight lines joining a terminal end of the blocking fixing portion, a rotation center of the top rod body and a bottom surface of the seat.

In some implementations, the blocking fixing portion bends upwardly relative to the rotating portion.

DETAILED DESCRIPTION OF THE INVENTION

Figure 1:
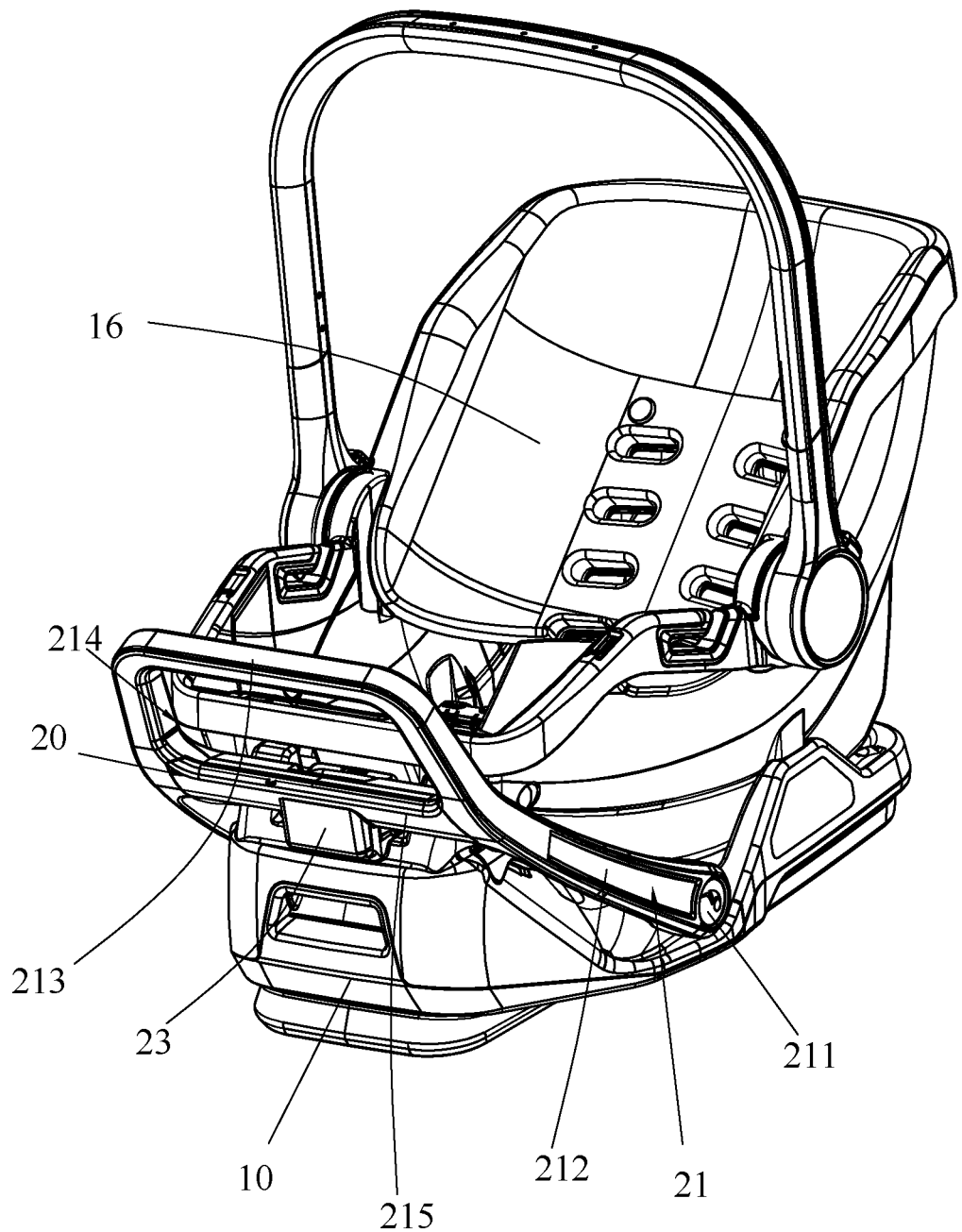
FIG. 1 is a schematic view of a seat, with a seat belt fixing device located at a locked position and holding a carrycot in place, according to the present disclosure.

To facilitate understanding of the object, characteristics and effects of this present disclosure, embodiments together with the attached drawings for the detailed description of the present disclosure are provided.

Referring to FIG. 1 through FIG. 8, a seat 100 is provided. The seat 100 holds thereon a seat belt fixing device 20 and a fixedly engaging element 11 in place. The seat belt fixing device 20 includes a seat belt clamp 30, top rod body 21, locking element 22, and operating element 23 coupled to locking element 22. The seat belt clamp 30 includes a first clamping element 31 formed on seat 100 and a second clamping element 32 rotatably configured on seat 100. The second clamping element 32 is rotatable to a locked position to clamp a seat belt (not shown) and the top rod body 21 while operating in conjunction with the first clamping element 31. The top rod body 21 and second clamping element 32 are connected and rotate concentrically. The locking element 22 is configured at a terminal end of the second clamping element 32. At the locked position, the locking element 22 is fittingly, engagingly coupled to the fixedly engaging element 11 to lock the top rod body 21 and second clamping element 32. The operating element 23 is operated to drive movement of the locking element 22 in order to control the fittingly engagement between the locking element 22 and the fixedly engaging element 11.

The fixedly engaging element 11 and locking element 22 together form a locking component. The fixedly engaging element 11 is configured (formed) on the seat 100. The locking element 22 is configured on the second clamping element 32. However, the present disclosure is not restricted to the embodiment. In a variant embodiment, the locking element 22 is also formed on the seat 100, and the fixedly engaging element 11 is configured or formed on the second clamping element 32, allowing the operating element 23 to be positioned on the seat 100.

Figure 8:
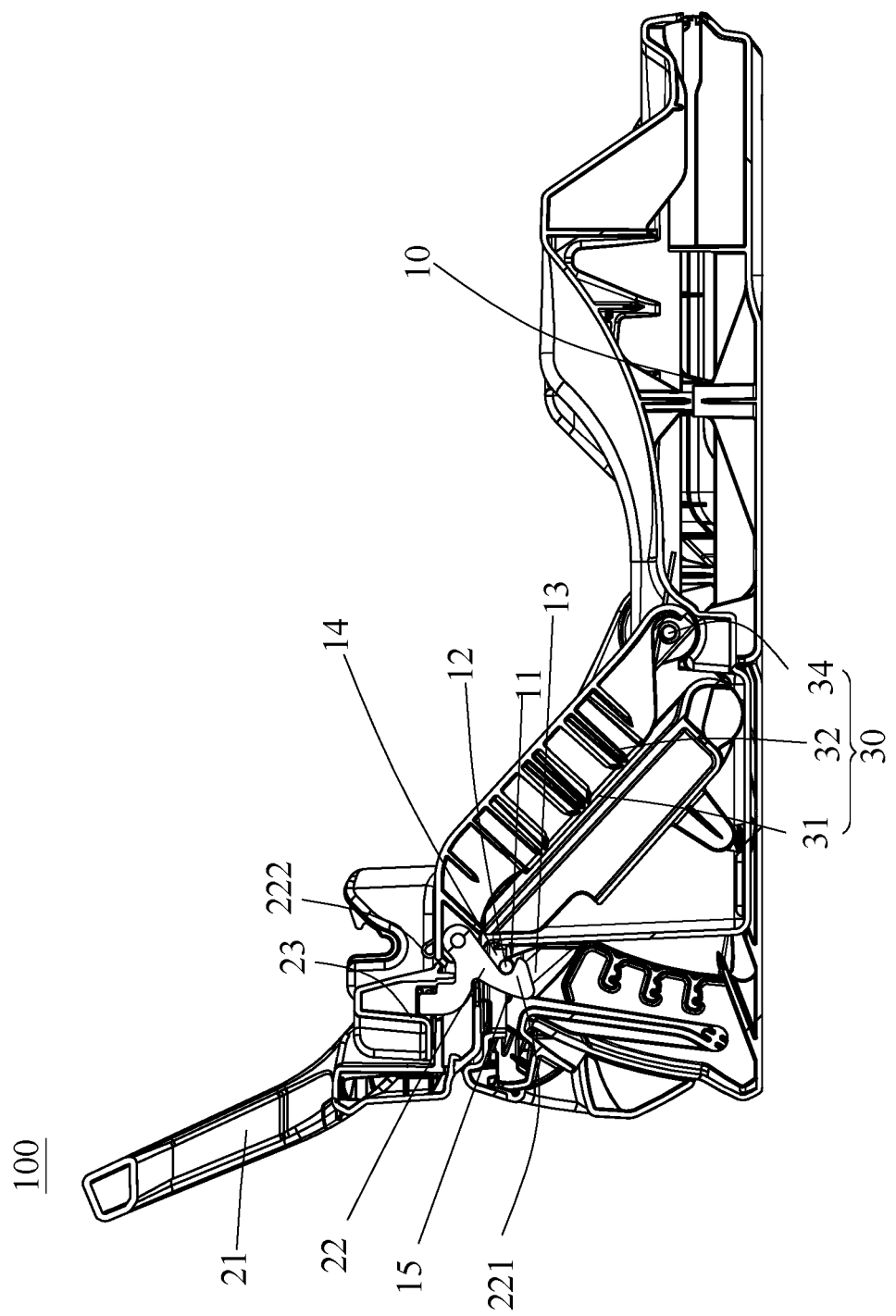
FIG. 8 is a cross-sectional view taken along line B-B of FIG. 7.

Referring to FIG. 8, in this embodiment, the top rod body 21 is rotatably configured on the seat 100 and rotates concentrically together with the second clamping element 32. The top rod body 21 has one end rotatably coupled to the seat 100 and the other end directly coupled to the second clamping element 32. In a variant embodiment, the top rod body 21 can be coupled to the second clamping element 32 through a third element or directly configured on the rotating shaft 34 of the second clamping element 32, provided that the top rod body 21 rotates with the second clamping element 32.

Figure 9:
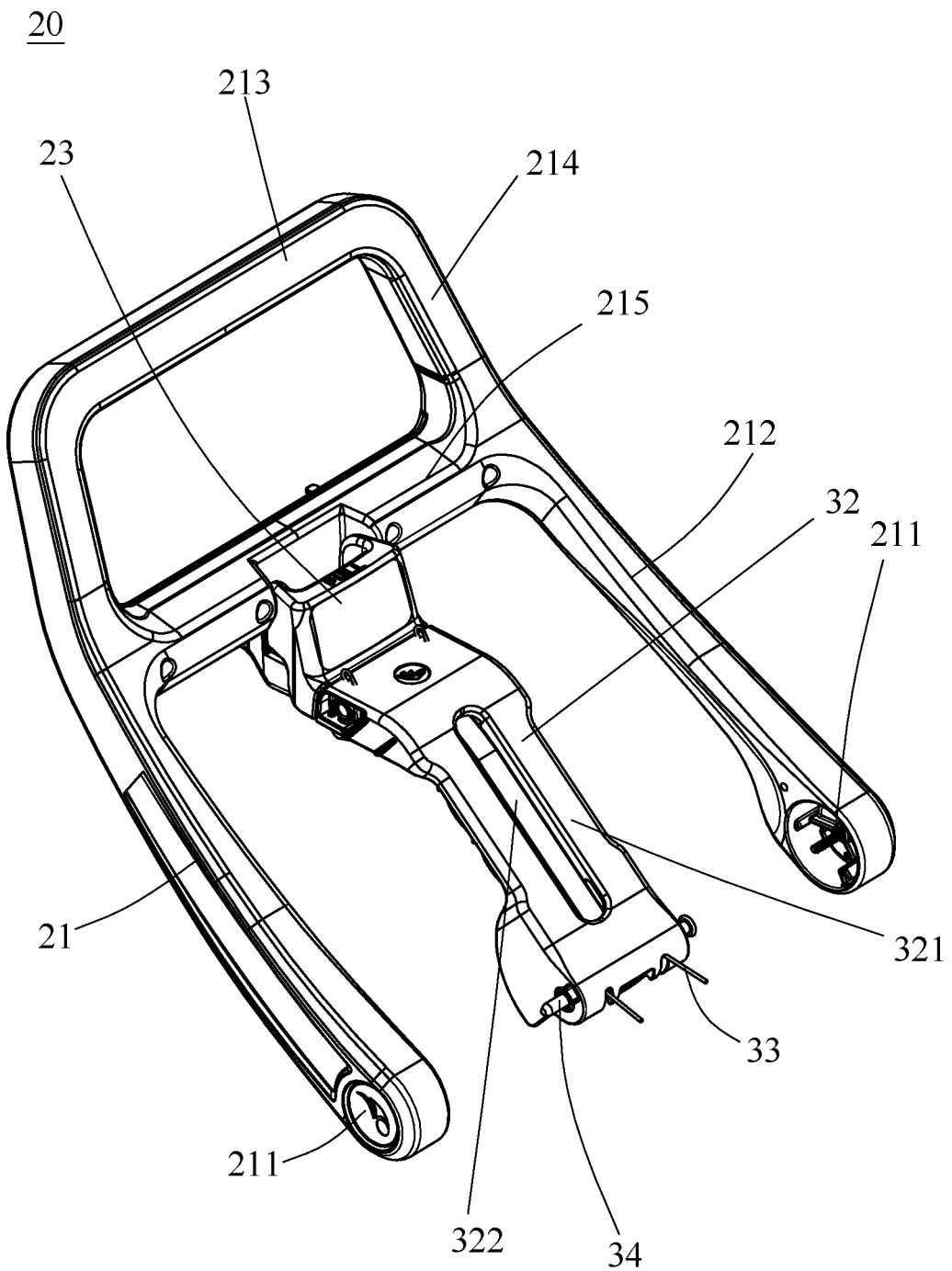
FIG. 9 is a schematic view of the seat belt fixing device according to the present disclosure.
Figure 10:
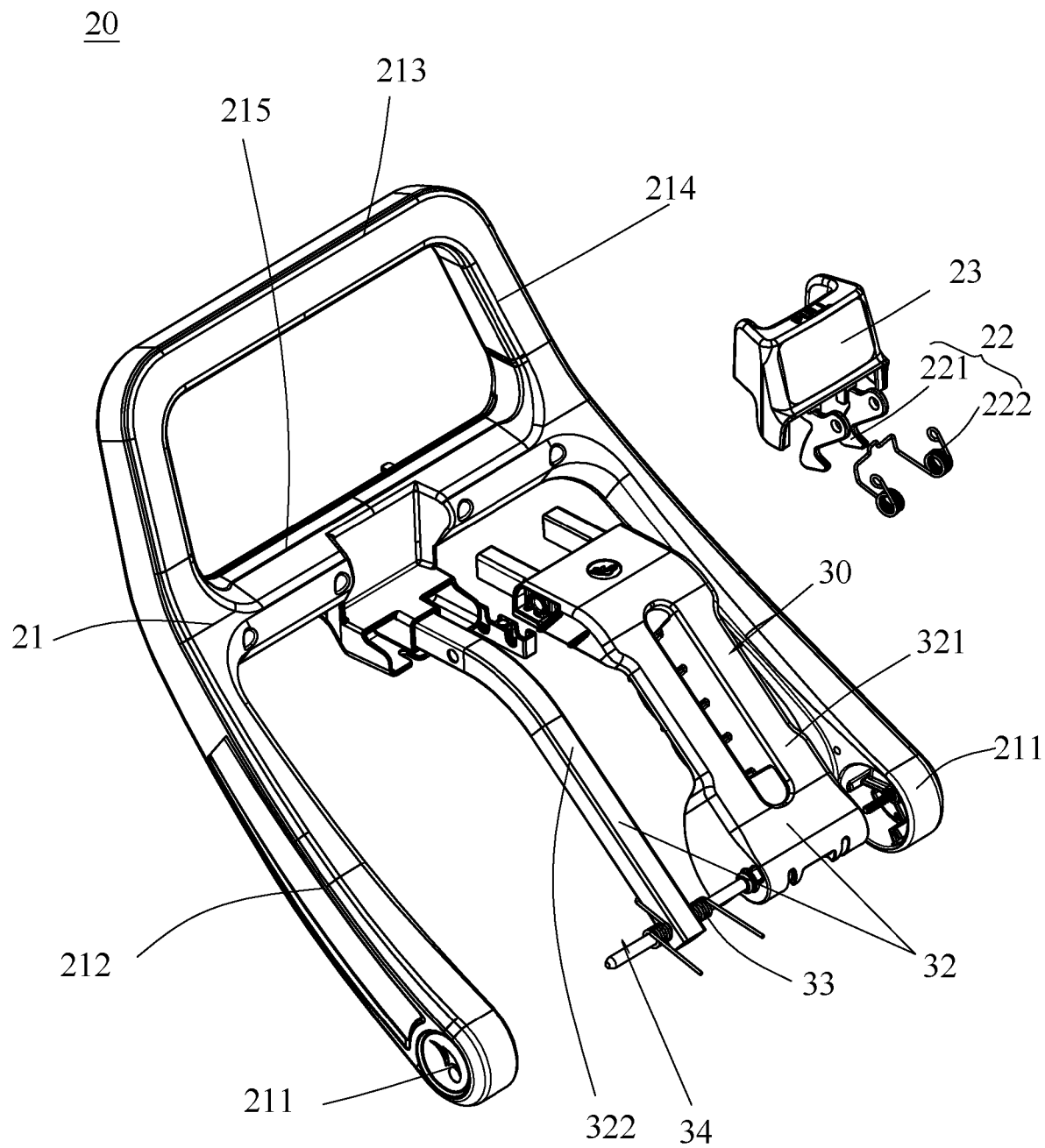
FIG. 10 is an exploded view based on FIG. 9.

Referring to FIG. 8 through FIG. 10, the seat belt clamp 30 further includes a second resilient element 33 coupled to the second clamping element 32. The second resilient element 33 provides to the second clamping element 32 a resilience force for moving away from the locked position. After the operating element has released the locking element, the second clamping element 32 rotates under the action of the second resilient element 33 to move away from the locked position, automatically unfastens the seat belt, and allows users to position or remove the seat belt.

Referring to FIG. 10, the second clamping element 32 includes a clamping portion 321 operating in conjunction with the first clamping element 31 and a reinforcing portion 322 coupled to the clamping portion 321. The reinforcing portion 322 has a front end coupled to the rotating shaft 34 of the second clamping element 32 and a terminal end inserted into the top rod body 21.

In this embodiment, the seat 100 includes a carrycot 16 and a base 10. The fixedly engaging element 11 is disposed on the base 10. The second clamping element 32 and top rod body 21 are rotatably coupled to the base 10. The first clamping element 31 is formed on the base 10. In this embodiment, the carrycot 16 is removably installed on the base 10. Alternatively, the seat 100 is any other safety seat rather than restricted to this embodiment, for example, the carrycot 16 is a seat body of a safety seat for use by infants or juveniles.

Figure 2:
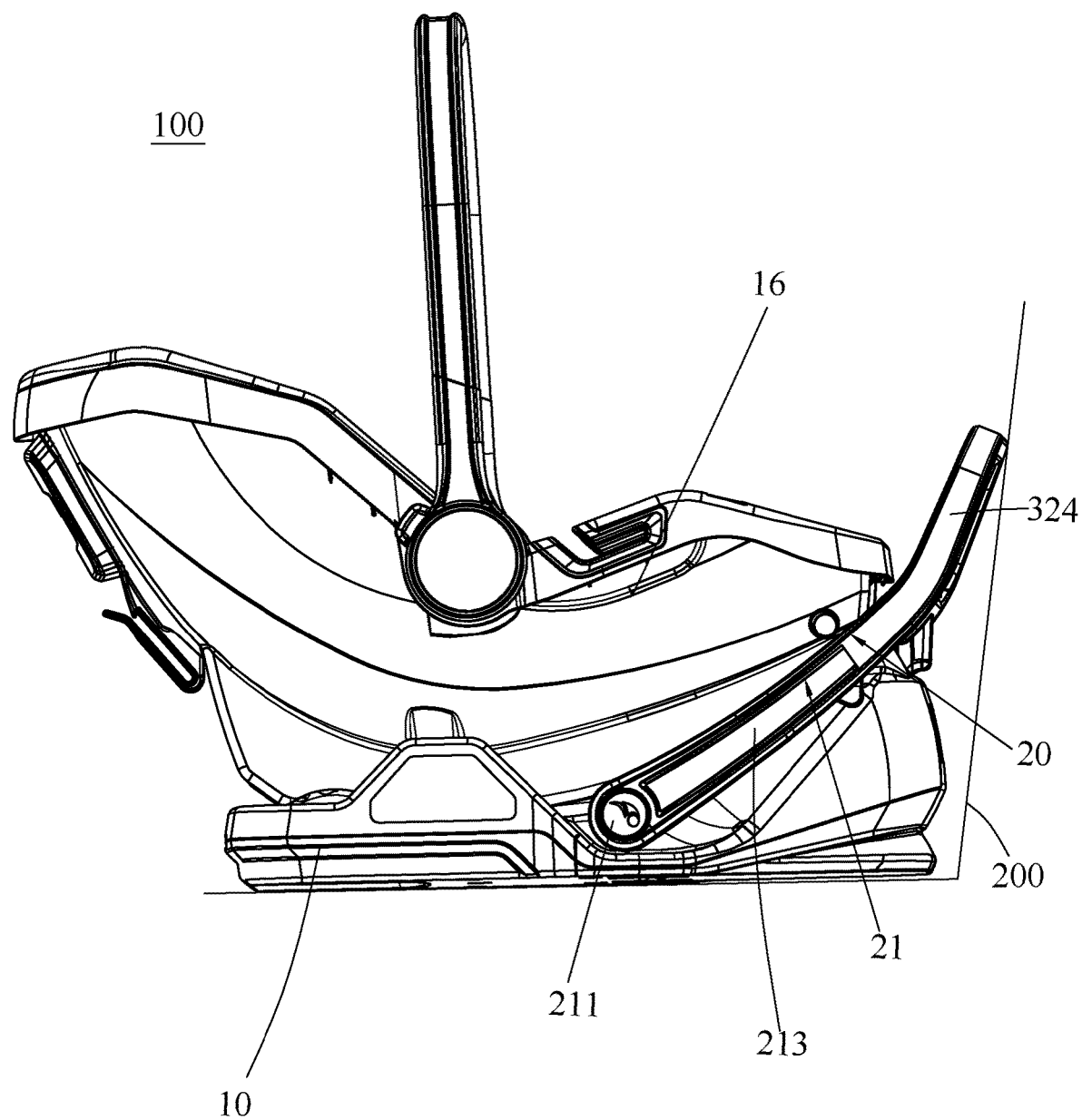
FIG. 2 is a lateral view based on FIG. 1.
Figure 3:
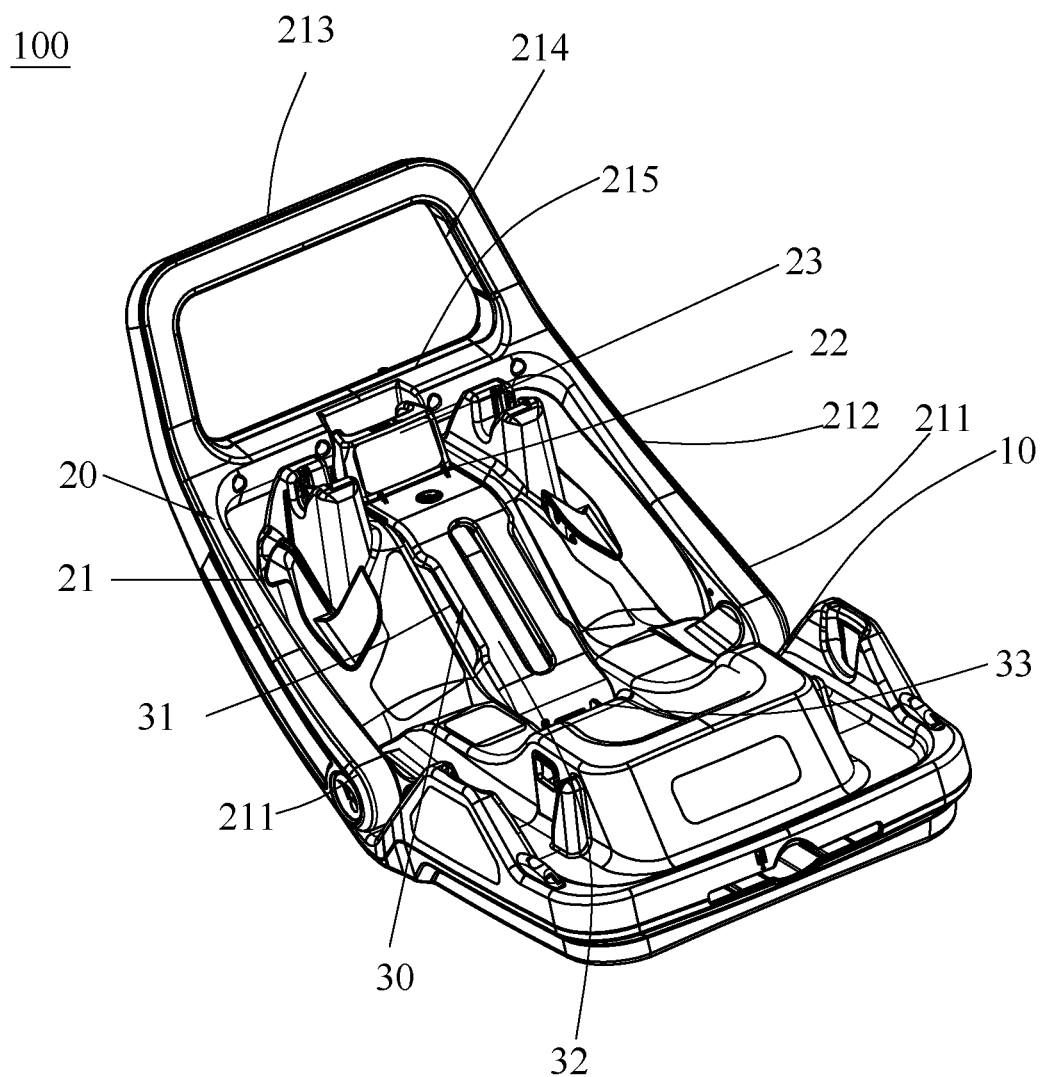
FIG. 3 is a schematic view of the seat, with the seat belt fixing device located at the locked position but not holding the carrycot, according to the present disclosure.

Referring to FIG. 2, FIG. 3 and FIG. 8, in this embodiment, the top rod body 21 is configured on the base 10 and abuts against a stabilizing rail of a vehicular seat back rest 200. When the top rod body 21 is at the locked position, its terminal end extends to the outer edge of the seat 10 to form a blocking fixing portion 214 capable of protruding from the base 10 of the seat 100. The blocking fixing portion 214 abuts against the vehicular seat back rest 200. Alternatively, the top rod body 21 is configured on the base 10 and abuts against a support post of the vehicular seat back rest 200. At the locked position, a terminal end of the top rod body 21 extends to below the seat 10 to form a support post capable of protruding from below the base of the seat 100 and supportedly disposed between the seat 100 and the floor in the vehicle. The abovementioned constitutes a preferred embodiment of the present disclosure.

Referring to FIG. 2, an acute angle is formed between a straight line joining a terminal end of the blocking fixing portion 214 and the rotation center of the top rod body 21 and the bottom surface of the base 10 of the seat 100. In this embodiment, the rotation center of the top rod body 21 may be located at the middle of the base 10. Alternatively, the rotation center of the top rod body 21 may be located at the middle and the front end of the base 10 to reduce the included angle between the bottom surface of the base 10 and the top rod body 21, and the included angle between the top rod body 21 and the base 10 is preferably less than or equal to 45°. When the seat 100 is installed on the vehicular seat, the terminal end of blocking fixing portion 214, the rotation center of top rod body 21, and the vehicular seat together form a tripod-shaped structure to stabilize the seat 100. Referring to FIG. 2, the terminal end of top rod body 21, i.e., the terminal end of blocking fixing portion 214, is higher than the rear edge of the base of the seat 100 to further enhance the safety of the seat 100.

Referring to FIG. 2, the terminal end of top rod body 21 upwardly bends and extends, i.e., blocking fixing portion 214 to bend upward relative to the front half of top rod body 21; hence, the contact area between the blocking fixing portion 214 and the back of the vehicular seat increases, thereby augmenting mechanical strength of the top rod body 21.

Figure 4:
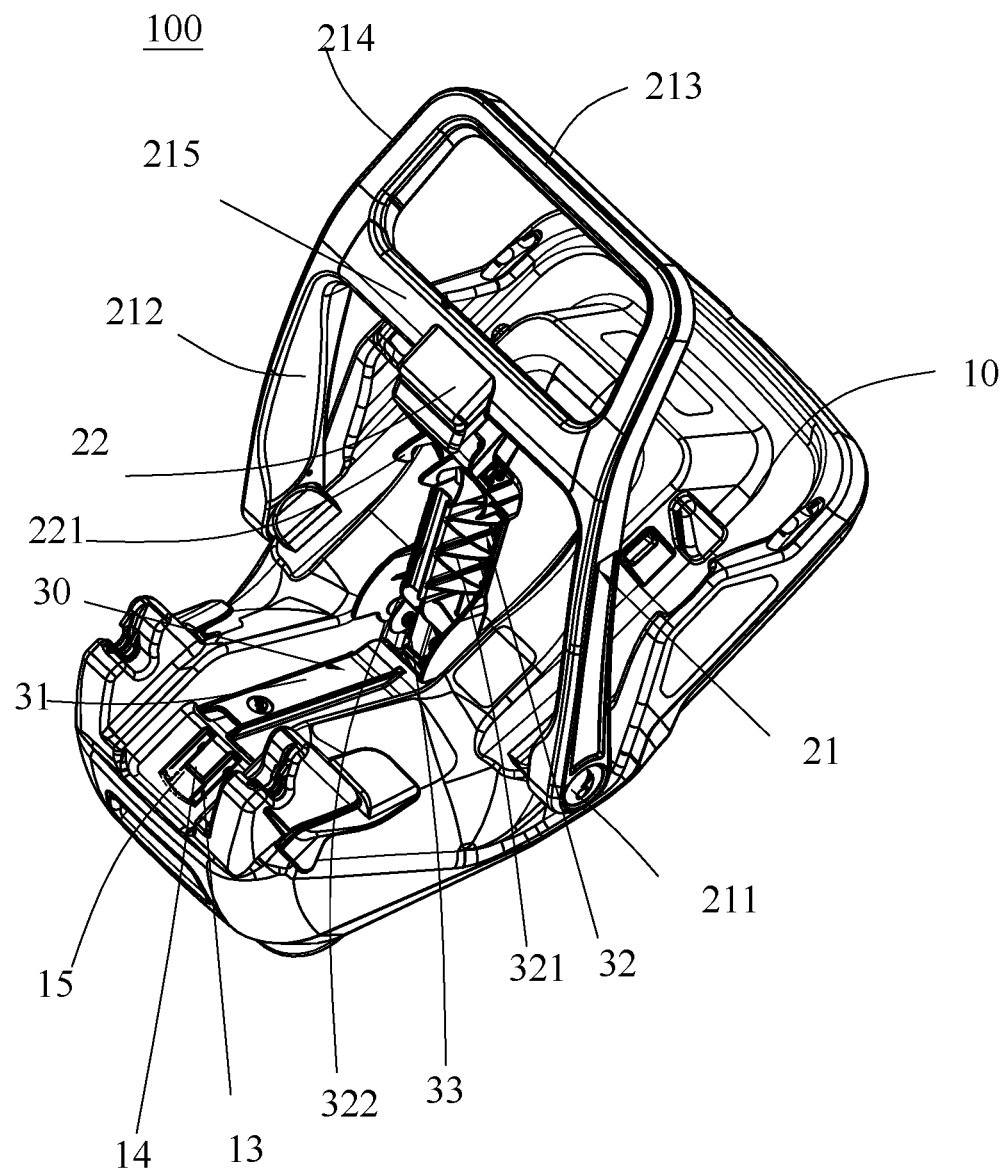
FIG. 4 is a schematic view of the seat, where the seat belt fixing device has exited the locked position.
Figure 5:
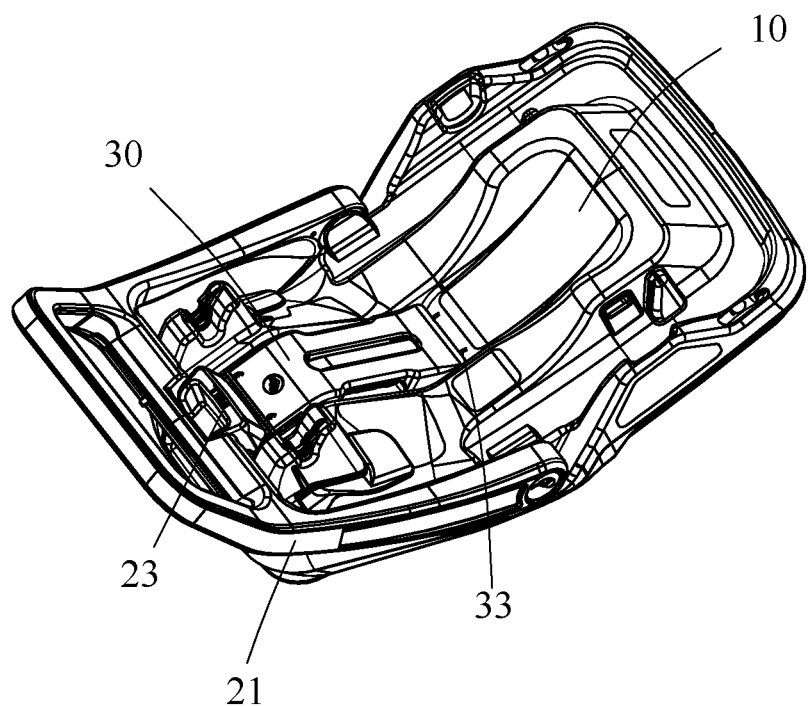
FIG. 5 is a schematic view based on FIG. 3 and taken at another angle.
Figure 6:
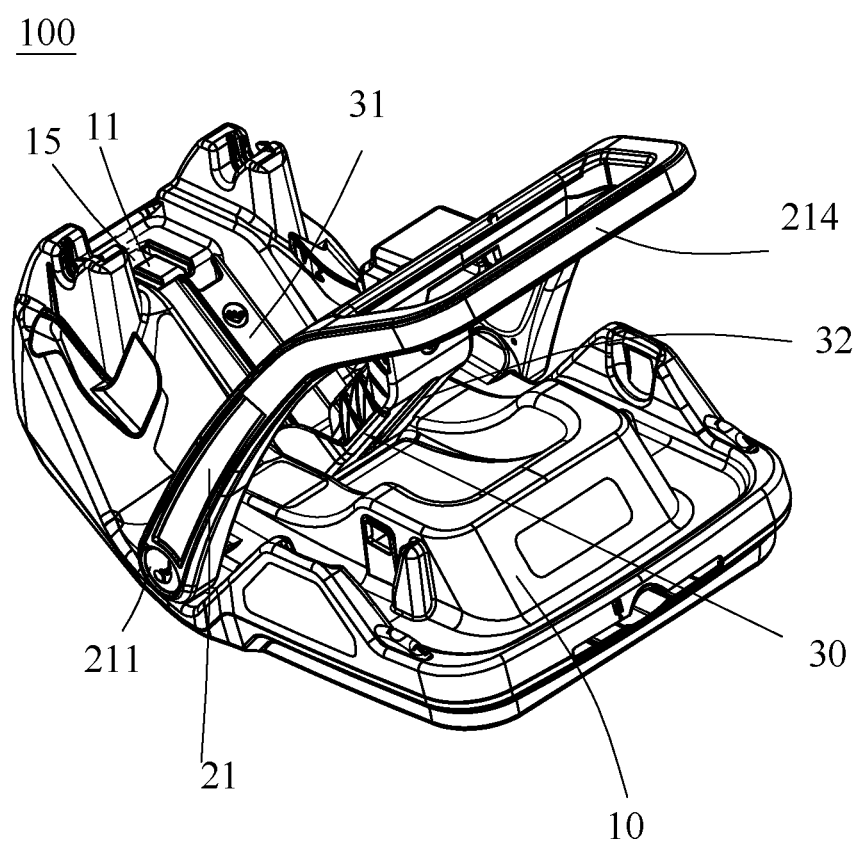
FIG. 6 is a schematic view based on FIG. 4 and taken at another angle.
Figure 7:
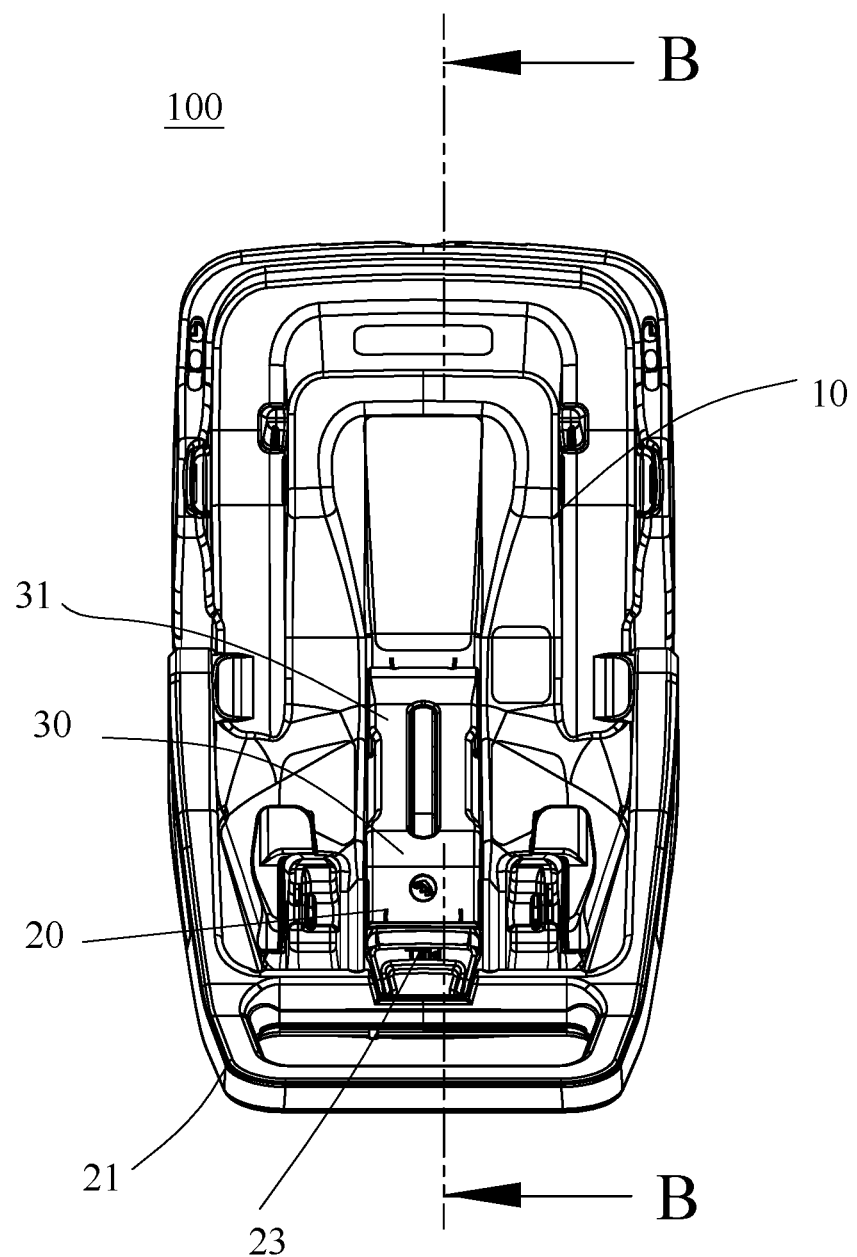
FIG. 7 is a top view based on FIG. 3.

Referring to FIG. 3 and FIG. 4, the top rod body 21 includes a rotating portion 211 rotatably configured on the base 10, two rotation arms 212 coupled to the rotating portion 211 and flanking the base 10, and a blocking transverse arm 213 coupled to terminal ends of two rotation arms 212. The blocking transverse arm 213 and the terminal ends of two rotation arms 212 form a blocking fixing portion 214. The embodiment is just an exemplary, and the structure of the top rod body 21 is subject to changes as needed. In this embodiment, the rotating portion 211 is rotatably configured on a rotating axle concentric with the rotating shaft 34. Alternatively, the rotating portion 211 is directly rotatably mounted on the rotating shaft 34.

Referring to FIG. 3 and FIG. 4, the top rod body 21 further includes a mounting rod 215 coupled to the rotation arms 212, and the locking element 22 is configured on the mounting rod 215. Alternatively, the mounting rod 215 is coupled to the blocking transverse arm 213 or coupled to the rotation arms 212 and blocking transverse arm 213. The terminal ends of rotation arms 212 bend by tilting upward. The mounting rod 215 is coupled to the bends of the two rotation arms 212. The mounting rod 215 is substantially parallel to the blocking transverse arm 213. The abovementioned is just an exemplary embodiment.

Referring to FIG. 3 and FIG. 4, the second clamping element 32 is coupled to the middle of the mounting rod 215, and the locking element 22 is configured at the terminal end of second clamping element 32, i.e., located at the middle of the mounting rod 215 as well. Alternatively, the locking element 22 is configured on a lateral edge of the mounting rod 215. In another embodiment, the locking element 22 is directly configured on the rotation arms 212.

Referring to FIG. 8 and FIG. 10, the locking element 22 includes a fittingly engaging element 221 and a first resilient element 222. The fittingly engaging element 221 is movably configured on the top rod body 21 and snap-engaged with the fixedly engaging element 11. The first resilient element 222 provides to the fittingly engaging element 221 a resilience force for fittingly, engagingly coupling to the fixedly engaging element 11. The operating element 23 is coupled to the fittingly engaging element 221. The operating element 23 is operated to controllably cause the fittingly engaging element 221 to separate from the fixedly engaging element 11. The user may rotate the top rod body 21 until the top rod body 21 reaches the locked position, such that the fittingly engaging element 221 is driven by the first resilient element 222 to approach the fixedly engaging element 11 and fittingly, engagingly couple to the fixedly engaging element 11, so as to lock the top rod body 21 to the locked position.

In this embodiment, the fittingly engaging element 221 is rotatably coupled to the top rod body 21. When driven by the first resilient element 222 and operating element 23, the fittingly engaging element 221 rotates relative to the top rod body 21 and thus fittingly engages with the fixedly engaging element 11 or separates from the fixedly engaging element 11. The fittingly engaging element 221 includes a fixedly engaging end fittingly, engagingly coupled to the fixedly engaging element 11 and a connection end abuttingly coupled (or coupled by any other means as long as the operating element 22 can drive the rotation of the fixedly engaging element 11) to the operating element 22. The embodiment is just an exemplary, and thus the locking element 22 is not restricted to the aforesaid structure. For example, the locking element 22 is directly, abuttingly, movably configured at the top rod body 21 and driven by the operating element 23 to fittingly engage with the fixedly engaging element 11 or separate from the fixedly engaging element 11. Alternatively, the fittingly engaging element 221 is configured on the second clamping element 32 or seat 100, for example, on the base 10 or first clamping element 31.

Referring to FIG. 9 and FIG. 10, the operating element 23 includes a press button resiliently mounted on the top rod body 21. Alternatively, the operating element 23 is a push element or pull element rather than restricted to the aforesaid structure. In this embodiment, the operating element 23 and locking element 22 abut against and connect to each other and are driven by the first resilient element 222 to undergo position restoration. In some embodiments, the operating element 23 may also be fixedly coupled to the locking element 22.

Referring to FIG. 4 and FIG. 8, in this embodiment, the fixedly engaging element 11 is a fixedly engaging groove, and the fittingly engaging element 221 is a fittingly engaging hook fittingly, engagingly coupled to the fixedly engaging groove. Alternatively, the fixedly engaging element 11 may be implemented by a hole, bump, fittingly engaging edge, and the locking element 22 may also have a corresponding bump, hole, or fittingly engaging platform.

Referring to FIG. 8, the fixedly engaging groove further has therein a fixing cylinder (fixing rod) 12 rotatably configured in place. When the fittingly engaging element 221 and fixedly engaging element 11 are fittingly, engagingly coupled, the dent of the fittingly engaging hook comes into contact with the corresponding point on the fixing cylinder 12; hence, the fittingly engaging hook can be driven to exit the fixedly engaging groove by the operating element 23. The outer surface of the fixing cylinder 12 matches the inner surface of the fittingly engaging hook to increase the stability of the fittingly engagement therebetween; their arcuate, matching surfaces not only reduce the wear and tear otherwise caused by the abutting engagement between the fixedly engaging groove and fittingly engaging hook but also allow the fittingly engaging hook to separate from the fixedly engaging groove easily. It also allows to reduce the friction of the fittingly engaging hook sliding out of the fixedly engaging groove when the fittingly engaging hook is inadvertently stuck. Alternatively, the fixing cylinder 12 may be a roller rotatably configured in place within the fixedly engaging groove. When the fittingly engaging hook exits the fixedly engaging groove, the fittingly engaging hook comes into contact with the roller and drives the roller to rotate to assist the fittingly engaging hook in separating from the fixedly engaging groove, thereby further reducing the friction of the fittingly engaging hook sliding out of the fixedly engaging groove. In other cases, the fixing cylinder 12 may have an arcuate fixing edge that matches the fittingly engaging element 221 rather than is restricted to the aforesaid embodiment.

Referring to FIG. 4 and FIG. 8, a receiving chamber 13 is disposed at the base 10 of the seat 100 and corresponds in position to the locking element 22. A resilient arm 14 is extended from one side of the receiving chamber 13. A recess 15 for receiving the fittingly engaging hook (fittingly engaging element 221) is formed between an end portion of the resilient arm 14 and another side (opposite to the extending sidewall) of the receiving chamber 13. The fixedly engaging groove (fixedly engaging element 11) is formed below the end portion of the resilient arm 14. In this embodiment, the fixedly engaging element 11 is configured on the seat 100, and the abovementioned constitutes only an exemplary of the present disclosure. In other embodiments, the fixedly engaging element 11 is configured on the second clamping element 32 or top rod body 21. In those embodiments, the fittingly engaging element 221 is configured on the base 10 of the seat 100.

While the present invention has been described by means of specific embodiments, numerous modifications and variations could be made thereto by those skilled in the art without departing from the scope and spirit of the present invention set forth in the claims.

What is claimed is:
1. A seat belt fixing device, comprising:
a top rod body pivotally disposed and selectively locked to a seat; and
a seat belt clamp disposed on the seat, the seat belt clamp comprising:
a first clamping element; and
a second clamping element coupled to the top rod body for being rotated to a locked position to clamp a seat belt in conjunction with the first clamping element;
wherein the second clamping comprises a rotating shaft, a clamping portion and a reinforcing portion, the top rod body is configured on the rotating shaft, the clamping portion operates in conjunction with the first clamping element, the reinforcing portion is coupled to the clamping portion and has a front end and a terminal end, the front end is coupled to the rotating shaft, and the terminal end is inserted into the top rod body.

2. The seat belt fixing device according to claim 1, further comprising a locking element and a fixedly engaging element, the locking element is configured to be selectively coupled to the fixedly engaging element to lock the top rod body.

3. The seat belt fixing device according to claim 2, further comprising an operating element coupled to the locking element for selectively engaging the locking element to the fixedly engaging element.

4. The seat belt fixing device according to claim 2, wherein the locking element comprises a fittingly engaging element and a first resilient element, the fittingly engaging element selectively engages the fixedly engaging element, and the first resilient element abuts against the fittingly engaging element.

5. The seat belt fixing device according to claim 4, wherein a fixedly engaging groove is formed on the fixedly engaging element, the fittingly engaging element is a hook, and the hook is selectively engagingly coupled to the fixedly engaging groove.

6. The seat belt fixing device according to claim 1, wherein the seat belt clamp further comprises a second resilient element abutting against the second clamping element.

7. The seat belt fixing device according to claim 1, wherein the top rod body comprises a rotating portion, a rotation arm and a blocking transverse arm, the rotating portion pivotally disposed on the seat, an end of the rotation arm is connected to the rotating portion, and the blocking transverse arm is perpendicularly disposed on another end of the rotation arm.

8. The seat belt fixing device according to claim 7, wherein the top rod body further comprises a mounting rod connected between the rotating portion and the rotation arm, the seat belt fixing device further comprises a locking element, and the locking element is disposed on the mounting rod.

9. The seat belt fixing device according to claim 7, wherein the rotation arm and the blocking transverse arm form a blocking fixing portion, a straight line on a lateral view of the seat is defined by joining a terminal end of the blocking fixing portion and a rotation center of the top rod body, and an acute angle is formed between the straight lines and a bottom surface of the seat on the lateral view of the seat.

10. The seat belt fixing device according to claim 9, wherein the blocking fixing portion bends upwardly relative to the rotating portion.

* * * * *